June 22, 1926.
R. BENSON
GAME TRAP
Filed July 14, 1925 2 Sheets-Sheet 1
1,589,929
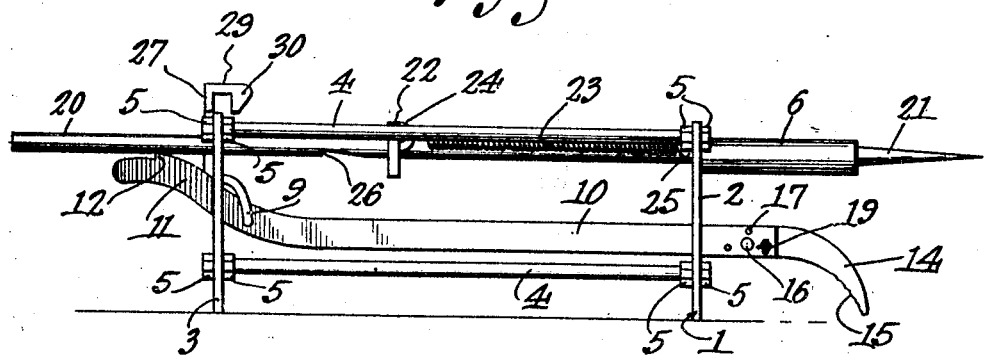
Fig. 1.
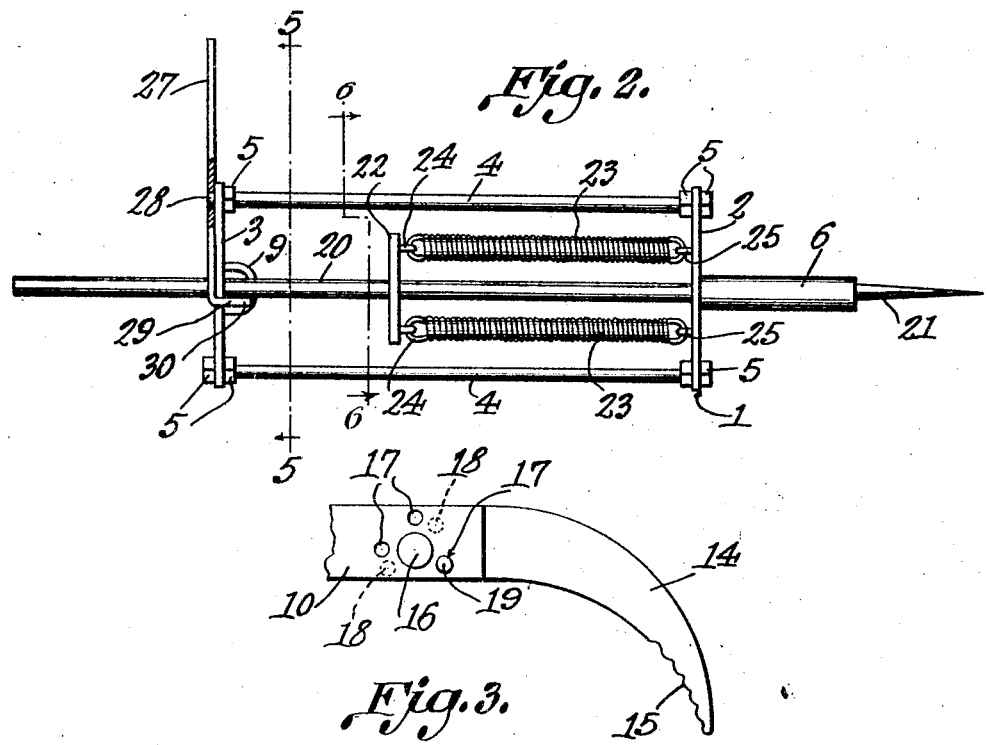
Fig. 2.
Fig. 3.
Inventor
Robert Benson
By C A Snow & Co
Attorneys June 22, 1926.

R. BENSON

GAME TRAP

Filed July 14, 1925  2 Sheets-Sheet 2

1,589,929

Inventor
Robert Benson
By C A Snow & Co
Attorneys

Patented June 22, 1926.

1,589,929

UNITED STATES PATENT OFFICE.

ROBERT BENSON, OF SKAMOKAWA, WASHINGTON.

GAME TRAP.

Application filed July 14, 1925. Serial No. 43,590.

The device forming the subject matter of this application is a trap, including a spear on which the animal is impaled, and the invention aims to provide novel means for mounting the spear and controlling its movements.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing form the spirit of the invention.

In the accompanying drawings:—

Figure 4:
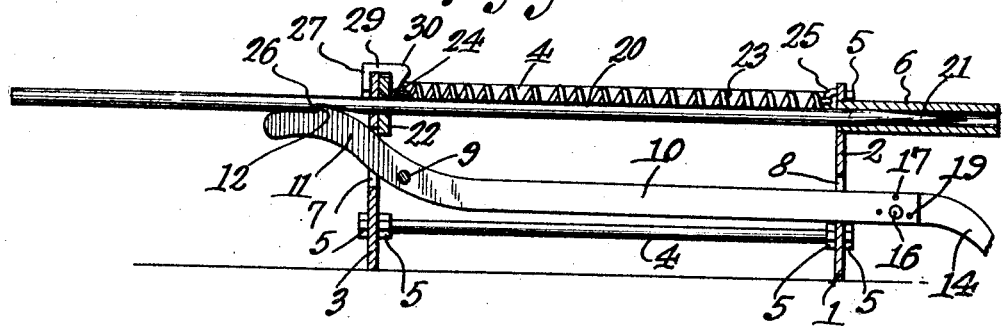
Figure 5:
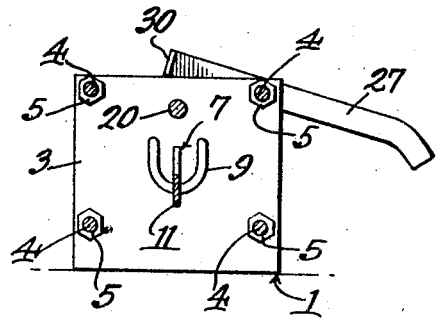
Figure 6:
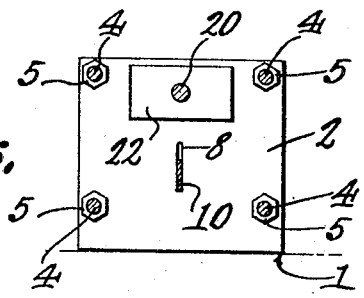

Figure 1 shows in side elevation, a device constructed in accordance with the invention; Figure 2 is a top plan; Figure 3 is a fragmental side elevation showing a portion of the trigger and the bait holder; Figure 4 is a longitudinal section wherein the trap is set; Figure 5 is a section on the line 5—5 of Figure 2, looking toward the rear of the trap; Figure 6 is a transverse section on the line 6—6 of Figure 2.

The trap forming the subject matter of this application preferably is made of metal throughout, and includes a frame 1 comprising a vertical front plate 2 and a vertical back plate 3 united by connections 4, such as rods, the rods 4 carrying nuts 5 which cooperate with the plates 2 and 3. A forwardly presented tubular guide 6 is mounted on the front plate 2. There is a vertically elongated slot 7 in the back 3, and the front plate 2 is provided with a similar slot or opening 8. The numeral 9 designates a loop-shaped depending fulcrum member, projecting inwardly from the back plate 3 and connected to the back plate on opposite sides of the slot 7.

The numeral 10 designates a vertically movable trigger provided at its rear end with an upwardly inclined arm 11 movable in the slot 7 of the back plate 3, the forward end of the trigger 10 being vertically movable in the slot 8 of the front plate 2. Outwardly of the back plate 3, the arm 11 of the trigger 10 is supplied with a shoulder 12. The numeral 14 designates a bluntly pointed, downwardly curved bait holder provided upon its concaved lower edge with teeth 15. The bait holder 14 is connected by a pivot element 16 to the outer end of the trigger 10, beyond the front plate 2, for vertical swinging adjustment.

There are openings 17 in the trigger 10, disposed in an arc on which the pivot element 16 is a center. Openings 18 are formed in the bait holder 14. When the openings 17 and 18 are brought into registration, a securing element or pin 19 may be inserted into the registering openings, thereby retaining the bait holder 14 in any position to which it may have been adjusted vertically with respect to the trigger 10.

A spear 20 is mounted for horizontal right line reciprocation in the back plate 3 and in the tubular guide 6 which is carried by the front plate 2. The spear 20 has a point 21. A cross head 22 is secured intermediate its ends to the spear 20, and is located between the plates 2 and 3. Retractile springs 23 are located on opposite sides of the spear 20. The inner ends of the springs 23 are connected at 24 to the ends of the cross head 22, the outer ends of the springs 23 being connected at 25 to the front plate 2. The spear 20 has a shoulder 26.

The numeral 27 designates a latch disposed transversely of the frame 1. The latch 27 is pivotally mounted at 28, intermediate its ends, on one of the rods 4 which connect the plates 2 and 3. The latch 27 swings vertically in engagement with the back plate 3. The latch 27 has an arm 29 overhanging the back plate 3 and provided with a depending finger 30.

In practical operation, the spear 20 is retracted, the springs 23 being put under tension. The trigger 10 is swung upwardly at its rear end, and the shoulder 12 on the trigger engages with the shoulder 26 on the spear, to hold the spear retracted, the point 21 of the spear being housed within the guide 6, as shown in Figure 4. During the setting of the trap, or at any other time, the latch 27 may be tilted on its pivotal mounting 28, so that the finger 30 will engage with the cross head 22, and hold the spear 20 retracted, as in Figure 4. When the trap is set and ready for use, the latch 27, of course, is disengaged from the cross head 22. The bait is placed on the bait holder 14. An animal, approaching the trap, pulls upwardly on the bait, tilting the trigger 10, on its fulcrum and disengaging the shoulder 12 of the trigger from the shoulder 26 on the spear 20, the spear moving forwardly, responsive to the spring 23, and the animal being impaled on the point 21 of the spear. Owing to the fact that the bait holder 14 can be adjusted vertically with respect to the forward end of the trigger 10, the vertical distance between the bait holder 14 and the line or reciprocation of the spear 20 may be changed, thereby adapting the trap to animals of different sizes, and assuring an impaling of the animal on the point 21 of the spear 20 as the animal seizes the bait on the bait holder 14 and tilts the trigger 10 to spring the trap.

Having thus described the invention, what is claimed is:—

1. In a device of the class described, a frame comprising a front plate and a back plate disposed about parallel to each other, and connections uniting the plates; a spear slidable in both plates and having a shoulder, a cross head on the spear, a retractile spring connected with the cross head and with the front plate, a trigger extended through both plates and mounted to swing therein, a bait holder on the trigger, means for mounting the trigger intermediate its ends on the back plate for swinging movement, the rear end of the trigger being located outwardly of the back plate and cooperating with the shoulder of the spear, outwardly of the back plate, to hold the spear retracted against the action of said spring means, and a latch fulcrumed on one of the aforesaid connections for swinging movement in a direction substantially at right angles to the line of reciprocation of the spear, and cooperating with the cross head to hold the spear retracted.

2. In a device of the class described, a frame comprising a front plate and a back plate disposed about parallel to each other, and connections uniting the plates; a spear slidable in both plates and having a shoulder, spring means for advancing the spear, a trigger extended through both plates and mounted to swing therein means for mounting the trigger intermediate its ends on the back plate for swinging movement, the rear end of the trigger being located outwardly of the back plate and cooperating with the shoulder of the spear, outwardly of the back plate, to hold the spear retracted, a bait holder located outwardly of the front plate, means for mounting the bait holder pivotally on the trigger, and means cooperating with the bait holder and with the trigger for retaining the bait holder in adjusted positions.

In testimony that I claim the foregoing as my own, I have hereto affixed my signature.

ROBERT BENSON.